US012616199B2

(12) United States Patent
Martelletti

(10) Patent No.: US 12,616,199 B2
(45) Date of Patent: May 5, 2026

(54) CRYSTALLISATION-FREE, HIGHLY CONCENTRATED SUSPENSION CONCENTRATES OF METRIBUZIN AND DIFLUFENICAN

(71) Applicant: Bayer Aktiengesellschaft, Leverkusen (DE)

(72) Inventor: Arianna Martelletti, Sulzbach im Taunus (DE)

(73) Assignee: BAYER AKTIENGESELLSCHAFT, Leverkusen (DE)

(*) Notice: Subject to any disclaimer, the term of this patent is extended or adjusted under 35 U.S.C. 154(b) by 918 days.

(21) Appl. No.: 17/635,850

(22) PCT Filed: Aug. 19, 2020

(86) PCT No.: PCT/EP2020/073155
§ 371 (c)(1),
(2) Date: Feb. 16, 2022

(87) PCT Pub. No.: WO2021/032764
PCT Pub. Date: Feb. 25, 2021

(65) Prior Publication Data
US 2022/0295792 A1 Sep. 22, 2022

(30) Foreign Application Priority Data
Aug. 20, 2019 (EP) .................................... 19192728

(51) Int. Cl.
*A01N 43/40* (2006.01)
*A01N 25/04* (2006.01)
*A01N 25/30* (2006.01)
*A01N 43/707* (2006.01)

(52) U.S. Cl.
CPC ........... *A01N 43/40* (2013.01); *A01N 43/707* (2013.01)

(58) Field of Classification Search
CPC .............................. A01N 43/707; A01N 43/40
See application file for complete search history.

(56) References Cited

U.S. PATENT DOCUMENTS

| | | | | | |
|---|---|---|---|---|---|
| 4,508,659 | A * | 4/1985 | Rowson | A01N 37/44 | 558/445 |
| 4,912,099 | A * | 3/1990 | Webb | A01N 55/04 | 514/183 |
| 5,045,554 | A * | 9/1991 | Alt | C07D 277/56 | 548/200 |
| 6,074,987 | A * | 6/2000 | Shafer | A01N 25/04 | 504/132 |
| 8,461,080 | B2 | 6/2013 | Sixl et al. | | |
| 2002/0155954 | A1* | 10/2002 | Aven | A01N 25/04 | 504/348 |
| 2009/0062127 | A1* | 3/2009 | Liu | A01N 25/22 | 504/361 |
| 2011/0039704 | A1 | 2/2011 | Sixl et al. | | |
| 2014/0242622 | A1* | 8/2014 | Petrich | A61B 5/1495 | 435/26 |
| 2017/0202219 | A1 | 7/2017 | Ouse et al. | | |
| 2019/0021311 | A1 | 1/2019 | Krause et al. | | |

FOREIGN PATENT DOCUMENTS

| | | | | |
|---|---|---|---|---|
| CN | 109 757 502 | A | 5/2019 | |
| EP | 0110174 | A1 | 6/1984 | |
| EP | 0620971 | A1 | 10/1994 | |
| EP | 1790228 | A1 | 5/2007 | |
| EP | 3395172 | A1 * | 10/2018 | A01N 43/40 |
| GB | 1 542 637 | A | 3/1979 | |
| JP | 2011 168517 | A | 9/2011 | |
| WO | 2009/021985 | A2 | 2/2009 | |
| WO | 2011018188 | A2 | 2/2011 | |
| WO | 2015124330 | A1 | 8/2015 | |
| WO | 2018/196640 | A1 | 11/2018 | |
| WO | 2018196639 | A1 | 11/2018 | |
| WO | 2019067407 | A1 | 4/2019 | |

OTHER PUBLICATIONS

Molecular Probes, "Pluronic® F-127," 2008, retrieved from the Internet: <https://documents.thermofisher.com/TFS-Assets/LSG/manuals/mp03000.pdf>.*

PCT International Search Report for PCT/EP2020/073155, mailed Nov. 5, 2020.

* cited by examiner

*Primary Examiner* — John Pak
(74) *Attorney, Agent, or Firm* — Michael VanEngelen

(57) ABSTRACT

The invention relates to the technical field of surfactant combinations combined with rheological modifiers combinations for crop protection formulations with increased shelf life and reduced crystallization, in particular herbicidal formulations, and formulations containing said surfactant combinations, as well as methods for producing said formulations.

10 Claims, No Drawings

CRYSTALLISATION-FREE, HIGHLY CONCENTRATED SUSPENSION CONCENTRATES OF METRIBUZIN AND DIFLUFENICAN

CROSS-REFERENCE TO RELATED APPLICATIONS

This application is the National Stage entry of International Application No. PCT/EP2020/073155, filed 19 Aug. 2020, which claims priority to European Patent Application No. 19192728.4, filed 20 Aug. 2019.

BACKGROUND

Field

Surfactant and rheology modifiers combination for agrochemical (crop protection) formulations with increased shelf life and reduced crystallization, in particular for agrochemical formulations comprising metribuzin and diflufenican.

The invention relates to the technical field of surfactant combinations combined with rheological modifiers combinations for crop protection formulations with increased shelf life and reduced crystallization, in particular herbicidal formulations, and formulations containing said surfactant combinations, as well as methods for producing said formulations.

In a preferred embodiment, the instant invention relates to highly loaded aqueous formulations of herbicides, in particular aqueous formulations containing metribuzin and diflufenican.

In particular, the invention relates to a high loaded suspension concentrate containing metribuzin and diflufenican with improved chemical and specifically physical stability.

Description of Related Art

To enhance the efficiency of applying herbicidal active ingredients, it is highly desirable to combine two or more active ingredients in a single formulation. Applying a combination of active ingredients with different modes of action can also provide for greater weed control. Concentrate compositions containing high loadings of multiple active ingredients are economical to transport and store. Concentrated compositions containing high loadings of multiple active ingredients (i.e., pre-mix concentrates) are also beneficial in avoiding or reducing mixing errors when preparing the application mixture in the field.

Active substances can in principle be formulated in a great variety of ways, wherein the properties of the active substances and the nature of the formulation can lead to problems with regards to the processing, stability, usability and effectiveness of the formulations. In addition, for economic and ecological reasons certain formulations are more advantageous than others.

Storage stability of suspended pesticide particles is a common problem in agrochemical formulation. Several additives and methods are known which try to avoid such problems. However, there is still the need to further improve the storage stability of such formulations.

Apart from this, there is in general a demand for highly concentrated (highly loaded) formulations of active substances, since the higher concentration has many advantages. Thus, for example with highly concentrated formulations a lower expenditure on packaging is necessary than with less concentrated formulations. Similarly, the expenditure for production, transport and storage decreases; also, for example, the preparation of the spraying mixtures is simplified owing to the smaller quantities of for example pesticides which have to be handled, e.g. in the filling and mixing process.

The active substances from the 1,2,4-triazinones group, such as metamitron and metribuzin, are highly effective herbicides with activity against harmful plants in plant crops.

Metribuzin (IUPAC name: 4-amino-6-tert-butyl-4,5-dihydro-3-methylthio-1,2,4-triazin-5-one; 4-amino-6-tert-butyl-3-methylthio-1,2,4-triazin-5(4H)-one) is a triazinone herbicide and has the following chemical structure:

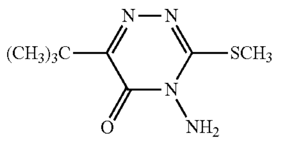

Metribuzin is an inhibitor of photosynthesis in plants. The compound can be absorbed by roots and leaves of the plants and then translocate in the xylem. Metribuzin is active in the control of grasses and broad-leaved weeds. Metribuzin is commercially available in herbicidal compositions and methods for its preparation are known in the art.

Water-based formulations, such as aqueous suspension concentrates (SC), as a rule have the advantage that no organic solvents are required. Aqueous suspension concentrates for the formulation of agrochemically active substances are known.

Thus, for example aqueous suspension concentrates of pesticides are described in WO 2011018188 A1 and EP 0110174 A1. In the latter a mixture of formaldehyde condensation products or lignosulfonates and wetting agents is preferably used.

From US 2011/039704 A1 it is known that aqueous, aluminum silicate-free, highly concentrated suspension concentrates, containing the active substance metribuzin, one or more surfactants based on nonionic polymers from the 'acrylic grafted polymers' group, one or more rheology modifiers based on anionic heteropolysaccharides from the xanthan gum group can be prepared and are chemically and physically stable.

Attempts on the basis of US 2011/039704 A1, which refers to the currently marketed formulation of aluminum silicate-free SC with 600 g/L metribuzin as active substance (corresponding to ca. 52.2 wt. %), to prepare a formulation with 600 g/L (in total) of a mixture of metribuzin and diflufenican were unsuccessful. Thus, the milling process by means of bead mills was found to be unworkable since, storage led to caking and crystallization of the prepared SC.

Further, suspension concentrates of metribuzin are known for example from WO2018196639 A1 as well as suspension concentrates of metribuzin with diflufenican from WO 2018196640 A1, wherein specific surfactant combinations are used for stabilization of the suspension.

However, the disclosed surfactant combinations still do not impart full physical stability of the suspension, thus, especially for the water soluble metribuzin component, crystallization and/or caking, still occurs.

Moreover, various thickeners have been used to stabilize the formulations. The use of a mixture of hydroxymethylcellulose based rheology modifier and an inorganic compound, among others synthetic amorphous silica is disclosed in WO 2019067407 A1.

Also, WO 2015124330 A1 discloses the use of hydroxypropyl methylcellulose in combination with a xanthan gum or inorganic clay.

For the active substance metamitron, EP 0620971 A1 describes a concentrated aqueous suspension based on mixtures of ethoxylated, optionally phosphate group-containing tristyrene- and alkyl-phenols and ligninsulfonate salts. However, the use of these formulation approaches did not lead to the desired results for metribuzin.

EP 1790228 A1 describes how a concentrated aqueous suspension concentrate can be produced for metribuzin by the use of a mixture of surfactants based on substituted phenol ethers with alumino silicate-based thickeners, such as for example attapulgite.

On the other hand, metribuzin crystallizes easily, in particular when heated at higher temperatures of >=40° C., and in particular when mixed with other herbicide partners, as diflufenican, leading to problems when preparing spray solutions from the formulation or worse, removing the active ingredient totally from the mix, for example by precipitation.

Diflufenican (IUPAC name: 2',4'-difluoro-2-(a, a, a-trifluoro-m-tolyloxy)nicotinanilide) is a pyridinecarboxamide having the following chemical structure:

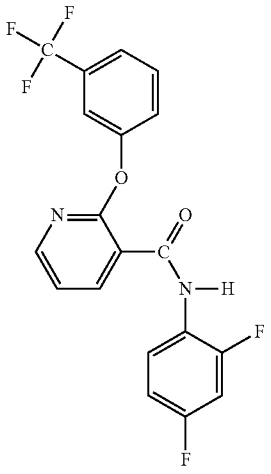 [SMILES: O=C(Nc1ccc(F)cc1F)c1cccnc1Oc1cccc(C(F)(F)F)c1]

Disadvantages of the prior art are, inter alia, that no high temperature storage stability of the formulation is achieved; that the particle size of the suspended agrochemical active substances is still growing; that the suspended agrochemical active still agglomerate; that suspended agrochemical active substances tend to settle down. It was therefore an object of the present invention to overcome these disadvantages.

There remains a need for formulation strategies that provide economic and convenient compositions that contain a combination of metribuzin and diflufenican herbicides along with additives such as surfactants and thickening agents that are stable upon formulation and over varied storage conditions.

In particular, the task was to provide suitable additive combinations for as well as formulations with the active substances metribuzin and diflufenican with high physical (e.g. reduction of crystallization, low viscosity, no hard sediment formation as caking) and chemical (e.g. reduction of degradation) stability.

Further, it was a task to provide highly loaded formulations for the active substances metribuzin and diflufenican, which are aluminum silicate-free and which have advantageous properties such as storage stability and low viscosity.

As well as this, a stable dispersion in the spray mixture is required, in which the then highly diluted active substance must be stable for several hours before application.

Such requirements for the stability of dispersions in spray mixtures do not arise at all for formulations for seed treatment (seed dressings, 'seed-treatment formulations or compositions'), since these are applied directly onto the seeds either concentrated or only slightly diluted. Thus, publications from this field, such as for example WO 2009/021985 A2, which exclusively relates to 'seed-treatment compositions', provide no suitable technical teaching whatever for the maintenance of stable dispersions in the spray mixture.

SUMMARY

Surprisingly it has now been found that the combination of two specific surfactants with at least one specific rheology modifier provides chemical and physical stability to formulations, in particular suspension concentrates (SC), comprising metribuzin and diflufenican with a total active loading of up to 600 g/L. The method according to the present invention provides a convenient means of incorporating a metribuzin component and a diflufenican component into a single composition.

It has been found that certain surfactants combinations in combination with certain thickeners or thickener systems provide high loaded herbicidal compositions exhibiting enhanced stability.

Hence, one aspect of the present invention is the use of the surfactant and rheology modifier combination of the instant invention in highly effective herbicide formulations (composition) with activity against harmful plants in useful plant (crop plants), wherein preferably the composition has no harmful effect on the useful plant, wherein, more preferably, the useful plant is soybean.

Another aspect of the present invention is the use of the surfactant and rheological modifiers combination of the instant invention in agrochemical formulation, preferably wherein the agrochemical formulations comprise as active ingredients metribuzin and diflufenican.

DETAILED DESCRIPTION OF A PREFERRED EMBODIMENT

Agrochemical compositions with metribuzin or diflufenican as active ingredient are well known.

The composition according to the invention comprises a water-insoluble agrochemical compound, wherein water insoluble preferably refers to a solubility in water of an active ingredient of 1 g/l or less, more preferably 0.5 g/L or less, and most preferably of 0.1 g/L or less, all measured at 20° C.

However, metribuzin displays relatively high water solubility, thus it is difficult to prepare formulations with a sufficient high loading and avoid crystallization issues.

While metribuzin has no solubility problem, it is physically instable in such formulations; in particular it is prone to crystallization. The use of a water-soluble herbicide (metribuzin 1.2 g/L at 20° C.) causes the problem that the tendency to crystallize increases. Furthermore, the use of the metastable polymorph renders difficult processing via milling since the temperature reached induces polymorph changes into the stable form of metribuzin, causing crystallization upon storage, even at room temperature.

Therefore, there is a need for stable formulations with high load of metribuzin and diflufenican.

The above outlined problems were overcome, and the object of the instant invention was achieved by an aqueous composition comprising a) metribuzin and diflufenican in form of suspended particles, and
b) at least one surfactant based on at least one ionic polymer selected from the group consisting of sodium lignosulfonates, and
c) at least one surfactant, selected from the group consisting of non-ionic block copolymers, and
d) at least one rheology modifier selected from the group of
d1) modified cellulose ethers, and
d2) synthetic amorphous silica, and
d3) modified polysaccharides which are different from the modified celluloses d1).

In one alternative embodiment the rheological modifier is selected from d1).

In one alternative embodiment the rheological modifier is selected from d2).

In one alternative embodiment the rheological modifier is selected from d3).

A rheological modifier d1)-d3) is an additive that when added to the recipe at a concentration that reduces the gravitational separation of the dispersed active ingredient during storage, results in a substantial increase of the viscosity of the formulation at low shear rates. Low shear rates are defined as 0.1 s-1 and below and a substantial increase is greater than 2× (double) for the purpose of this invention. The viscosity can be measured by a rotational shear rheometer.

Surfactant b) is preferably selected from the group consisting of sodium lignosulfonates, with low average molecular weight ($M_w$ about 4,300-43,000 preferably measured by GPC gel permeation chromatography or size exclusion chromatography). Even more preferred are low average molecular weight kraft lignosulfonate with a low degree of sulfonation, eg. Polyfon® H from Ingevity, CAS Number 8061-51-6.

Surfactant c) is preferably selected from the group consisting of non-ionic block copolymer of ethylene oxide and propylene oxide, e.g. Synperonic® PE/F 127 from CRODA or Pluronic® F 127 from BASF, CAS Number 9003-11-6.

Rheology modifier d1) is preferably selected from the group of modified cellulose ethers, more preferably from the group of methyl celluloses and most preferred is hydroxypropyl methylcellulose HPMC, for example Vivapur® K 15M from JRS Pharma (J. Rettenmaier & Soehne GmbH+Co.KG).

Rheology modifier d2) is preferably selected from the group of hydrophilic synthetic amorphous silica, hydrophobic synthetic amorphous silica, as well as fumed and precipitated silica, for example Aerosil® 200, from Evonik.

Rheology modifier d3) is preferably selected from the group of modified polysaccharides and polysaccharide gums [all other than d1)] e.g. gellan gum, jelutong gum, xanthan gum, guar gum, gum arabic, gum tragacanth, gum karya, tara gum, locust gum, agar agar, carrageenan, alginic acid, alginates (e.g. sodium, potassium, ammonium, or calcium alginates)), starch and its derivatives.

Preferred rheology modifiers d3) are polysaccharide gums. The rheology modifier is in particular xanthan gum, e.g. Rhodopol® G, Rhodopol® 23 from Solvay or Satiaxane® CX911 from Cargill.

Mixtures of any of the aforementioned rheology modifiers d1)-d3) are also suitable.

Excluded as rheological modifiers according to the invention are clays including montmorillonite, bentonite, smectite, sepiolite, attapulgite, laponite, hectorite. Examples are VANATURAL®,Veegum® R, Van Gel® B, Bentone® CT, HC, EW, Pangel® M100, M200, M300, S, M, W, Attagel® 50, Laponite® RD, VEEGUM®, Attaclay®, VAN GEL®.

In a preferred embodiment the surfactants and rheology modifiers combination (auxiliary combination) are used for chemical and physical stabilization of metribuzin and diflufenican in agrochemical compositions.

In a preferred embodiment the auxiliary combination comprises surfactant b), preferably a low average molecular weight kraft lignosulfonate with a low degree of sulfonation, i.e. Polyfon® H from Ingevity, surfactant c), preferably one block copolymer of ethylene oxide and propylene oxide, i.e. Synperonic® PE/F 127 from CRODA, and one rheology modifier selected from the group of rheological modifiers d1)-d3), wherein d1) is preferably hydroxypropyl methylcellulose, preferably, e.g. Vivapur® K 15M from JRS Pharma (J. Rettenmaier & Soehne GmbH+Co.KG), and rheology modifier d2) is preferably selected from the group consisting of synthetic amorphous silica, e.g. Aerosil® 200 from Evonik, and d3) is preferably selected from the group of xanthan gums, e.g. Rhodopol® 23 or Rhodopol® G from Solvay, wherein xanthan gums according to d3) are different from the cellulose ether d1).

In one embodiment the rheology modifier is d3).

In an even more preferred embodiment, the auxiliary combination comprises compounds b), c), d3).

In an even more preferred embodiment, the auxiliary combination comprises compounds b), c), d1) and at least one compound of d2) or d3).

In an even more preferred embodiment, the auxiliary combination comprises compounds b), c), d1) and at least one compound of d3).

In an even more preferred embodiment, the auxiliary combination comprises compounds b), c), d1) and at least one compound of d2).

Further preferred, the ratio of b) to c) is from 0.1:1 to 1:0.1, more preferred from 0.5:1 to 1:0.5, even more preferred from 0.8:1 to 1:0.8, and especially preferred 1:1.

In another embodiment the ratio of d1) to d2) or d1) to d3) is preferably from 1:0.5 to 1:15, more preferred from 1:1 to 1:8, and most preferred from 1:1.5 to 1:5.

In another aspect, the instant invention is directed to an auxiliary combination consisting of:

a) metribuzin and diflufenican in form of suspended particles, and
b) at least one surfactant based on at least one ionic polymer selected from the group consisting of sodium lignosulfonates, and
c) at least one surfactant, selected from the group consisting of non-ionic block copolymers, and
d) at least one rheology modifier selected from the group of
d1) modified cellulose ethers, and
d2) synthetic amorphous silica, and
d3) modified polysaccharides which are different from the modified celluloses d1).

In another embodiment, the instant invention is directed to an auxiliary combination consisting of:

a) metribuzin and diflufenican in form of suspended particles, and
b) at least one surfactant based on at least one ionic polymer selected from the group consisting of sodium lignosulfonates, and
c) at least one surfactant, selected from the group consisting of non-ionic block copolymers, and
d3) at least one rheology modifier selected from the group consisting of anionic heteropoly-saccharide selected from the group consisting of xanthan gums.

In a further embodiment, the instant invention is directed to an auxiliary combination consisting of:

a) metribuzin and diflufenican in form of suspended particles, and
b) at least one surfactant based on at least one ionic polymer selected from the group consisting of sodium lignosulfonates, and
c) at least one surfactant, selected from the group consisting of non-ionic block copolymers, and
d1) at least one rheological modifier, based on at least one hydroxypropyl methylcellulose HPMC, and
d2) at least one rheological modifier, based on at least one synthetic amorphous silica, or
d3) at least one rheological modifier, based on at least one anionic heteropoly-saccharide selected from the group consisting of xanthan gums.

If not otherwise indicated, ratios always refer to weight ratio in the instant application, whereas % refers to % by weight (w/w).

In another aspect, the instant invention provides aqueous crop protectant compositions, said compositions comprising a1) metribuzin,
a2) diflufenican,
b) at least one surfactant based on at least one ionic polymer selected from the group consisting of sodium lignosulfonates, and
c) at least one surfactant, selected from the group consisting of non-ionic block copolymers, and
d1) at least one rheology modifier selected from the group of modified cellulose ethers, and
d2)/d3) at least one rheology modifier selected from the group consisting of synthetic amorphous silica and polysaccharides which are different from the modified celluloses d1),
e) at least one polycarboxylic organic acid,
f) optionally, further customary formulation assistants, and water added to 100%.

In a preferred embodiment component e) is mandatory.

In the above b)-c) correspond to the surfactant combination described above and d1), d2), d3) correspond to the rheology modifier combination described above, both determining the auxiliary combination.

In an alternative, preferred embodiment component d) comprises d1) at least one rheological modifier, based on at least one hydroxypropyl methylcellulose HPMC, and
d2) at least one rheological modifier, based on at least one synthetic amorphous silica, or
d3) at least one rheological modifier, based on at least one anionic heteropoly-saccharide selected from the group consisting of xanthan gums.

In another embodiment, component d) of the composition is selected from d3) only.

The stated common names for active ingredients, such as metribuzin and diflufenican, are known to the skilled worker; see, for example, "The Pesticide Manual" British Crop Protection Council 2003; the names include the known derivatives such as salts, isomers, enantiomers and especially the commercially customary forms.

In another embodiment, the compositions of the instant invention comprise:

a1) metribuzin,
a2) diflufenican,
b) to d1)-d3) as auxilliary combination as described above,
e) non-oxidizing organic acids (polycarboxylic acids), preferably citric acid,
f) suitable other formulants, and water added to 100%.

In a preferred embodiment the organic acid is a non-oxidizing organic acid. In a more preferred embodiment, the organic acid e) is selected from the group comprising oxalic acid, malonic acid, succinic acid, adipic acid, maleic acid, fumaric acid and citric acid as well as mixtures thereof. More preferred the organic acid is citric acid.

Formulants f) are preferably selected from biocides, antifreeze, colorants, pH adjusters, buffers, stabilizers, antifoam substances, antioxidants, inert filling materials, humectants, crystal growth inhibitors, micronutrients.

Suitable antifoam substances are all substances which can customarily be employed in agrochemical agents for this purpose. Silicone oils, silicone oil preparations are preferred. Examples are Silcolapse® 426 and 432 from Elkem, Silfoam® SRE and SC132 from Wacker, SAG® 1572 and SAG® 30 from Momentive (Dimethyl siloxanes and silicones, CAS No. 63148-62-9). Preferred is Silcolapse® 454.

Possible preservatives are all substances which can customarily be employed in agrochemical agents for this purpose. Suitable examples for preservatives are preparations containing 5-chloro-2-methyl-4-isothiazolin-3-one [CAS-No. 26172-55-4], 2-methyl-4-isothiazolin-3-one [CAS-No. 2682-20-4] or 1,2-benzisothiazol-3(2H)-one [CAS-No. 2634-33-5]. Examples which may be mentioned are Preventol® D7 (Lanxess), Kathon® CG/ICP (Dow), Acticide® SPX (Thor GmbH) and Proxel® GXL (Arch Chemicals).

Suitable antifreeze substances are all substances which can customarily be employed in agrochemical agents for this purpose. Suitable examples are propylene glycol, ethylene glycol, urea and glycerin.

Possible colorants are all substances which can customarily be employed in agrochemical agents for this purpose. Titanium dioxide, carbon black, zinc oxide, blue pigments, Brilliant Blue FCF, red pigments and Permanent Red FGR may be mentioned by way of example.

Suitable stabilizers and antioxidants are all substances which can customarily be employed in agrochemical agents for this purpose. Butylhydroxytoluene [3,5-Di-tert-butyl-4-hydroxytoluol, CAS-No. 128-37-0] is preferred.

In accordance with the present invention, the herbicide combinations as defined herein or the composition comprising a herbicide combination as defined herein comprise a herbicidal effective amount of said herbicide combination and may comprise further components, for example agrochemical active compounds of a different type and/or formulation auxiliaries and/or additives customary in crop protection, or they may be employed together with these.

The type of active ingredients a1) and a2) used determine the type of pests which can be controlled by application of the crop protection compositions or agrochemical formulations. In case of herbicides the pests are undesired plants. Particularly preferred is the pre-emergent use up to early post-emergent, relative to weeds.

Further, the components a) to f) are present in the aqueous crop protectant compositions according to the present invention in the amounts as follows:

a1) 25%-40% of a water-soluble (1 to 2 g/L) agrochemical, metribuzin, preferably 28%-37%, most preferred 30-35%, a2) 10%-25% diflufenican, preferably 13%-22%, most preferred 15-20%, b) 1%-2%, preferably 1.2% to 1.5% and most preferred 1.33% of at least one surfactant selected from the group consisting of ionic polymer selected from the group consisting of sodium lignosulfonates, low molecular weight kraft lignosulfonate with a low degree of sulfonation, c) 1%-2%, preferably 1.2% to 1.5% and most preferred 1.33% of at least one surfactant selected from the group consisting of non-ionic polymer selected from the group consisting of a block copolymer of ethylene oxide and propylene oxide, d1) 0.05%-0.15%, preferably 0.08%-0.12% and most preferred 0.1% of at least one rheological modifier, based on at least one hydroxypropyl methylcellulose HPMC, d2) and d3) 0.05%-1.5%, preferably 0.1%-1.0% and most preferred 0.12%-0.8% and most preferred 0.65% of at least one rheological modifier, selected from the group of synthetic amorphous silica and anionic heteropolysaccharide, e) optionally 0.1%-0.3%, preferably 0.17%-0.23% and most preferred 0.2% of at least one polycarboxylic organic acid, f) optionally 0.1%-10% of further customary formulation assistants (antifreeze, biocides, antifoam), preferably 3%-9%, and most preferred 5%-7%, and water added to 100%.

Further preferred, in the composition above, compounds d2) and d3) is defined and present in the amounts as follows:

d2) 0.1%-1%, preferably 0.3%-0.7% and most preferred 0.5% of at least one rheological modifier selected from the group of synthetic amorphous silica, d3) 0.1%-0.2%, preferably 0.13%-0.17% and most preferred 0.15% of at least one rheological modifier, selected from the group of anionic heteropoly-saccharides.

Preferably, the anionic heteropoly-saccharide is xanthan gum.

Preferred are mixtures of HPMC d1) and xanthan gum d3), or with synthetic amorphous silica d2). Especially preferred are mixtures of HPMC d1) and synthetic amorphous silica d2).

In one alternative embodiment of compounds d) only d3) is present.

The composition comprises preferably d1) in 0.05 to 0.15%, more preferably 0.08 to 0.12%, and most preferred 0.1%.

The composition comprises preferably d2) in 0.1%-1%, preferably 0.3%-0.7% and most preferred 0.5%.

The composition comprises preferably d3) in 0.1%-0.2%, preferably 0.13%-0.17% and most preferred 0.15%

The Hydroxypropyl methylcellulose d1) may have a Brookfield viscosity of up to 22000 mPa*s, more preferably between 10000 and 21000 mPa*s, and in particular 11250-21000 mPa*s. at 20° C. The Brookfield viscosity was determined at 20° C. with a 2% aqueous solution and was measured with a Brookfield Viscometer.

The cellulose ether may contain 15 to 35%, preferably 17 to 30% and in particular 19 to 24% methoxy groups.

The cellulose ether may contain 3 to 30%, preferably 3 to 20% and in particular 4 to 12% hydroxypropoxy groups.

To avoid complete caking=hard sediment formation, it is preferred to use a combination of HPMC d1) with either a xanthan gum d3) or a synthetic amorphous silica d2).

Further, it is understood, that the preferred given ranges of the respective ingredients as given above can be freely combined and all combinations are disclosed herein, however, in a more preferred embodiment, the ingredients are preferably present in the ranges of the same degree of preference, and even more preferred the ingredients a) to f) are present in the most preferred ranges.

The liquid formulations or suspensions of the invention can be prepared by methods which are customary in principle, i.e., by mixing the components with stirring or shaking or by means of static mixing methods. The liquid formulations obtained are stable with good storage properties.

The liquid formulations comprising active ingredient and the adjuvant formulations are low-foam formulations with good storage properties and especially they display high flowability and low viscosity compared to other recipes known by the expert. In many cases they have very favorable technical properties on application. By way of example the formulations are distinguished by a low tendency to aggregate, e.g. during storage, to form a hard sediment, to crystallize, and high chemical stability of both active ingredients.

Accordingly, the formulations of the invention are especially suitable for use in crop protection where the formulations are applied to the plants, to parts of plants or to the area under cultivation.

In the case of herbicidal ingredients a1) and a2) the formulations are very suitable for controlling unwanted plant growth both on uncultivated land and in tolerant crops.

Advantages of the present invention are inter alia that it makes a high storage stability of the formulation possible (2 weeks 54° C. data); that the particle size growth of dispersed agrochemical active substances is slowed down or suppressed; that the agglomeration of dispersed agrochemical particles is slowed down or suppressed; that the settling of dispersed agrochemical active substances is slowed down or suppressed; that the abovementioned advantages are also attained in the presence of high salt concentrations.

The formulations of the present invention are especially useful for application in soybean, in particular for pre-emergent use up to early post-emergent.

The formulations of the present invention are especially also miscible with fertilizers without compromising chemical or physical stability or spray solution quality. Tank-mixing with glyphosate or glufosinate (water-soluble anionic herbicide salts) do not disrupt the physical or chemical stability of the suspension concentrate (SC).

USE EXAMPLES

The terms used in the examples below denote:

| | |
|---|---|
| Metribuzin | CAS-No.: 21087-64-9, IUPAC name: 4-amino-6-tert-butyl-4,5-dihydro-3-methylthio-1,2,4-triazin-5-one, melting point 126° C. (Bayer AG). |

-continued

| | |
|---|---|
| Diflufenican | CAS-no.: 83164-33-4, IUPAC name: N-(2,4-Difluorophenyl)-2-(3-(trifluoromethyl)phenoxy)nicotinamide, melting point 160° C. (Bayer AG). |
| 1,2-Propylene glycol | anti-freeze |
| Acticide ® B 20 | Aqueous dipropylene glycol solution of approx. 20% 1,2-Benzisothiazolin-3-on as sodium salt (Thor GmbH) |
| Acticide ® SPX | Microbicide based on Isothiazolones (Thor GmbH) |
| Aerosil ® 200 | Synthetic amorphous silica (silicon dioxide, from Evonik) |
| Citric acid anhydrous | poly organic acid |
| Polyfon ® H | sodium lignosulfonate, low molecular weight kraft lignosulfonate with a low degree of sulfonation (Ingevity) |
| Rhodopol ® G | xanthan gum derivative (Solvay) |
| Silcolapse ® 454 | silicon antifoam (Elkem Silicones) |
| Synperonic ® PE/F 127 | block copolymer of ethylene oxide and propylene oxide, MW 12000 (CRODA) |
| Vivapur ® K15 M | Hydroxypropyl methyl cellulose, HPMC (JRS Pharma, J. Rettenmaier & Soehne GmbH + Co.KG) |
| Atlox ® 4913 | Ethoxylated polymethacrylate (graft copolymer) in water and propylene glycol (CRODA) |
| Morwet ® D-425 | sodium naphthalene sulphonate formaldehyde condensate (Nouryon) |
| Proxel ® GXL | 20% Aqueous dipropylene glycol solution of approx. 20% 1,2-Benzisothiazolin-3-on as sodium salt (LONZA Group AG) |

General Procedure for the Preparation of a Suspension Concentrate (Table 1):

TABLE 1

Preparation of a suspension concentrate according to the present invention

| | Component | Example 1 Amount in % |
|---|---|---|
| a1) | Metribuzin | 33.90 |
| a2) | Diflufenican | 16.95 |
| f) | 1,2-Propylene glycol | 5 |
| f) | Acticide ® B 20 | 0.18 |
| f) | Acticide ® SPX | 0.08 |
| d2) | Aerosil ® 200 | 0.5 |
| e) | Citric acid anhydrous | 0.2 |
| b) | Polyfon ® H | 1.33 |
| f) | Silcolapse ® 454 | 0.2 |
| c) | Synperonic ® PE/F 127 | 1.33 |
| d1) | Vivapur ® K15 M | 0.1 |
| to 100 | Demineralized water | 40.23 |

Component c) and f) are initially introduced into demineralized water and stirred until fully dissolved. Then component b) is added under stirring, followed by components d1) and d2). Stirring is maintained and last finely grounded components a1) and a2), are added allowing longer stirring time to get them well wetted especially component a1) Milling on a WAB Research mill is started and continued until a homogeneous suspension has formed with a particle size d90 between 6-10 μm. After milling pH is adjusted with component e). The pH of the formulations measured at 100% ranged from 5.0 to 5.4 before storage at room temperature and 5.3 to 5.6 after two weeks 54° C. storage.

The resulting suspension according to the invention is storage-stable over a prolonged period and is very fluid. Even upon prolonged storage at high temperatures, the active substance a1) and a2) show only a very low degree of decomposition. The suspension according to the invention can be diluted with water to give a homogeneous suspension. It has outstanding activity against harmful plants while simultaneously being very well tolerated in crops of useful plants.

Definitions

Particle Size Measurements:

- d90: measured in μm, 90% of all particles lie below the stated diameter, particle size distribution: 90%, in metribuzin saturated aq. solution. Determination of the Particle Size: was performed according to the CIPAC method MT 187 by means of laser diffraction analysis.
- MIC:
- optical microscopy, d(max)/d(0.9), mean values measured by optical microscopy (internal method of large particle counting).

Storage Points:

- OTW=Start: freshly prepared product
- 2W54: storage for two weeks 54° C. and then evaluation of properties, especially particle size by laser diffraction and by optical microscopy and dynamic viscosity.
- 12WRT: storage twelve weeks at room temperature
- 12W35: storage twelve weeks at 35° C.
- 12W-10: storage twelve weeks at −10° C.
- Dyn. Visc. 20 l/s:
- Dynamic viscosity in mPas*s, Temperature: 20° C., shear rate: 20 l/s, Viscometer: Rotational viscometer. The determination of the viscosities was performed according to CIPAC method MT 192 and determinations were made with a normal commercial rotation viscosimeter RheoStress RS 150 from Haake. For the characterization of the flow properties, the dynamic viscosities were measured at one rate: at 20 l/s.

Appearance:

- visual evaluation eg settling, separated phases, hard sediment formation.

Examples of High Control of Crystal Growth of Metribuzin Component A1):

TABLE 2

Formulation examples where crystal growth was very limited/absent for component a1):

| Component | Example 1 Amount in % | Example 2 Amount in % | Example 3 Amount in % |
|---|---|---|---|
| Metribuzin | 33.90 | 33.90 | 33.90 |
| Diflufenican | 16.95 | 16.95 | 16.95 |
| 1,2-Propylene glycol | 5 | 5 | 5 |
| Acticide ® B 20 | 0.18 | 0.18 | 0.18 |
| Acticide ® SPX | 0.08 | 0.08 | 0.08 |

TABLE 2-continued

| Formulation examples where crystal growth was very limited/absent for component a1): | | | |
|---|---|---|---|
| Component | Example 1 Amount in % | Example 2 Amount in % | Example 3 Amount in % |
| Aerosil ® 200 | 0.5 | | |
| Citric acid anhydrous | 0.2 | 0.2 | 0.2 |
| Polyfon ® H | 1.33 | 1.33 | 1.33 |
| Rhodopol ® G | | | 0.15 |
| Silcolapse ® 454 | 0.2 | 0.2 | 0.2 |
| Synperonic ® PE/F 127 | 1.33 | 1.33 | 1.33 |
| Vivapur ® K15 M | 0.1 | 0.1 | 0.1 |
| Demineralized water | 40.23 | 40.73 | 40.58 |

Comparison of physical data of examples in Table 2 at start (OTW=fresh sample at room temperature) and after two weeks storage at 54° C. (Table 3):

TABLE 3

| particle size d90 (μm) and dynamic viscosity (mPas*s): | | | | |
|---|---|---|---|---|
| | | Example | | |
| Measurement | Storage time | 1 | 2 | 3 |
| d90 | OTW | 5.52 | 6.36 | 6.2 |
| Dyn.Visc. 20 1/s | OTW | 207 | 156 | 772 |
| d90 | 2W54 | 7.63 | 8.17 | 8.51 |
| Dyn.Visc. 20 1/s | 2W54 | 122 | 90 | 749 |

To this end, a first experiment involved preparing the abovementioned formulation according to the invention in accordance with the above-described method and storing the products for two weeks at 54° C.

The storage stability of the formulation according to the invention manifests itself for example in the form of a lesser degree of crystallization of the active substance component a1) upon storage at different temperatures.

All formulations prepared with the specific surfactant combination of the present invention were very fluid. Viscosity was very low, except for Example 3 where Rhodopol® G was used together with Vivapur® K 15 M.

The results in Table 3 show that the formulation according to the present invention show an extremely reduced change in d90 resulting in little crystal growth of component a1) between OTW and 2W54 storage conditions. This determines long-term storage stability and allows scale-up and industrialization.

TABLE 4

| Comparison of d(max) in μm, crystal size under the microscope after 2 weeks 54° C. storage | | | |
|---|---|---|---|
| Example 1 | Example 2 | Example 3 | Comparative example 1: example No. 1 in table 1, from US2011039704 |
| 13.08 | 13.55 | 14.33 | 62.43 |

The results in Table 4 show that the formulation according to the present invention show a lower d(max) of component a1) and smaller crystals as measured under the microscope (d(max)) compared to prior state of art (Comparative example 1: example No. 1 in table 1 from US2011039704) where only Rhodopol® G is used and a chemically completely different surfactant combination.

Examples where Crystal Growth was Present (Comparative Examples 2+3) Compared to the Present Invention:

TABLE 5

| Comparative Examples 2 and 3 (crystal growth not acceptable): | | | |
|---|---|---|---|
| Component | Comp. Example 2 Amount in % | Comp. Example 3 Amount in % | Example 4 Amount in % |
| Metribuzin | 33.90 | 33.90 | 33.90 |
| Diflufenican | 16.95 | 16.95 | 16.95 |
| 1,2-Propylene glycol | 5 | 5 | 5 |
| Acticide ® SPX | 0.08 | 0.08 | 0.08 |
| Aerosil ® 200 | | 0.5 | |
| Atlox ® 4913 | 4 | 4 | |
| Citric acid anhydrous | 0.1 | 0.1 | 0.2 |
| Morwet ® D-425 | 0.8 | 0.8 | |
| Polyfon ® H | | | 1.33 |
| Proxel ® GXL 20% | 0.18 | 0.18 | 0.18 |
| Rhodopol ® G | 0.15 | 0.15 | 0.15 |
| Silcolapse ® 454 | 0.2 | 0.2 | 0.2 |
| Synperonic ® PE/F 127 | 2.5 | 2.5 | 1.33 |
| Demineralized water | 36.14 | 36.64 | 40.68 |

TABLE 6

| particle size d90 (μm), appearance and dynamic viscosity (mPas*s): | | | | |
|---|---|---|---|---|
| | | Examples | | |
| Measurement | Storage time | Comp. Example 2 | Comp. Example 3 | Example 4 |
| d90 | OTW | 8.16 | 7.48 | 6.59 |
| Dyn.Visc. 20 1/s | OTW | 408 | 499 | 330 |
| Appearance | 2W54 | Separated phases | Separated phases | Homogeneous |
| d90 | 2W54 | 19.23 | 22.37 | 15.87 |
| Dyn.Visc. 20 1/s | 2W54 | 392 | 558 | 271 |
| d90 | 12W-10 | 8.28 | | 6.93 |
| Dyn.Visc. 20 1/s | 12W-10 | 26 | | 12.1 |
| MIC | 12W-10 | 408 | | 331 |
| d90 | 12W35 | 9.54 | | 6.91 |
| Dyn.Visc. 20 1/s | 12W35 | 369 | | 317 |
| MIC | 12W35 | 50 | | 29 |
| d90 | 12WRT | 7.96 | | 6.8 |
| Dyn.Visc. 20 1/s | 12WRT | 397 | | 326 |

Table 6 shows the increase of particle size d90 analyzed after preparation (OTW=initial, fresh product) and 2 weeks 54° C. storage by laser diffraction in metribuzin saturated aqueous solution. Table 3 showed that the particle size in the suspension concentrates according to Examples 1, 2, 3 increased to a lower degree compared to the suspension concentrates from comparative Examples 2, 3. Table 6 shows also the inventiveness of Example 4 over comp. Example 2 at different storage temperatures and times. Particle size d90 and viscosity are more advantageous in Example 4.

Tables with results as above show that by using a different surfactant system (as claimed Polyfon® H and Synperonic® PE/F 127, Example 4 vs comp. Examples 2 and 3) crystal growth at high temperature at 2W54 storage is reduced (d90 15.87 vs 19.23 and 22.37). This shows that the best fitting surfactant system (compared to the use of Atlox® 4913, Morwet® D-425 and Synperonic® PE/F 127) as in comp. Examples 2 and 3 already contributes to lowering the crystal growth of metribuzin component a1).

Example 4 after 2W54 storage remains homogeneous while comp. Examples 2 and 3 do show settling (separated phases), indicating that the change in surfactant system according to the present invention does have a positive impact on the physical stability of the formulation at high temperatures.

Example 4 produces a recipe with is more liquid, and flowable compared to comp. Examples 2 and 3 (dynamic viscosity at 20 l/s of 308 mPa*s compared to 408 and 499 at room temperature for freshly produced suspension concentrate). Comp. Example 3 indicates that the use of two rheology modifiers (Rhodopol® G and Aerosil® 200 not including a HPMC) has a negative influence on the viscosity, compared to Example 4 where only Rhodopol® G is used.

Example 4 shows clearly the advantage—within viscosity and crystal growth values—of the change in surfactant system and use of a known rheology modifier to obtain a fully fluid suspension concentrate high loaded (600 g/L total active ingredient loading). These properties combined together have a high advantage in shelf-life, storage stability at different temperatures and manufacturing, allowing a non-problematic scale-up and industrialization.

Upon storage over a period of 26 weeks at different times and temperatures, comp. Example 3 turned thick after 8 weeks storage whereas Example 4 kept the positive properties (fluidity).

Advantage of Example 4 over state of art comp. Example 2: storage at twelve weeks at different temperatures shows a clear advantage on particle size and viscosity of Example 4 over comp. Example 2 which shows that Example 4 has a more suitable surfactant system compared to comp. Example 2 for this metribuzin plus diflufenican high loaded suspension concentrate.

By changing the thickener system and by using an HPMC as Vivapur® K15 M alone (Example 2) or with Rhodopol® G (Example 3) compared to Example 4 where only a Xanthan Gum as Rhodopol® G is used, the crystal growth of the active metribuzin is even more reduced (d90 at two weeks 54° C. of 8.51 and 7.63 compared to 15.87 of Example 4).

By using as a partner to HPMC a fumed silica derivative as Aerosil® 200 (Example 1) the particle size is even more reduced compared to Examples 2 and 3: (d90 at two weeks 54° C. of 8.17 compared to 8.51, 7.63 of Examples 2 and 3).

Another clear advantage is the viscosity over the use of HPMC with a xanthan gum versus a fumed silica derivative. Example 1 and 2 show compared to Example 3 where Vivapur® K15 M and Rhodopol® G are used, that fresh milled samples from Example 3 already reach a dynamic viscosity at 20 l/s of 772 mPa*s. For high loaded SC suspension concentrate formulations, a typical viscosity range of 200 to 500 mPa*s is useful to have a product that is and stays liquid over storage and is pourable and flowable. Example 3 does not represent an example that could be industrialized since already too viscous. This negative behavior is more evident when the sample is stored at high temperatures (2 weeks 54° C.) where usually the viscosity decreases: in Example 3 with 779 mPa*s the viscosity shows that the product has no favorable bulk properties.

The optimal recipe is based on a new surfactant system combined with a thickener system composed by a HPMC and a fumed silica derivative. The use of Vivapur® K 15 M together with the specific surfactants Polyfon® H and Synperonic® PE/F 127 and addition of a fumed silica derivative as Aerosil® 200 has a clear advantage in crystal growth reduction on metribuzin active ingredient after two weeks 54° C. storage over the use of the same surfactant system with an HPMC alone or combined with a Xanthan Gum.

With comp. Example 2 storage at high temperatures does also show some caking (hard crystal crust at bottom of flask formed by metribuzin crystals which is not re-homogenizable).

The invention claimed is:

1. An aqueous agrochemical composition comprising:
- a1) 30%-35% (w/w) metribuzin;
- a2) 15%-20% (w/w) diflufenican in form of suspended particles;
- b) 1%-2% (w/w) of sodium lignosulfonates;
- c) 1%-2% (w/w) of non-ionic block copolymers of ethylene oxide and propylene oxide having a MW of about 12,000;
- d) at least one rheology modifier selected from the group consisting of:
  - d1) 0.05%-0.15% (w/w) hydroxypropyl methylcellulose (HPMC),
  - d1)+d2) 0.05%-0.15% (w/w) (HPMC) and 0.3%-0.7% (w/w) synthetic amorphous silica,
  - d1)+d3) 0.05%-0.15% (w/w) (HPMC) and 0.1%-0.2% (w/w) xanthan gums, and
  - d3) 0.1%-0.2% (w/w) of xanthan gums;
- e) 0.1%-0.3% (w/w) of citric acid;
- f) 5%-7% (w/w) of 1,2 propylene glycol; and
- g) water.

2. The aqueous agrochemical composition according to claim 1, wherein component d) is d3) only.

3. The aqueous agrochemical composition according to claim 1, wherein components b), c), d1), and e) are present in:
- b) 1.2% to 1.5% of sodium lignosulfonates,
- c) 1.2% to 1.5% of non-ionic block copolymers of ethylene oxide and propylene oxide having a MW of about 12,000,
- d1) 0.08%-0.12% of HPMC, and
- e) 0.17%-0.23% of citric acid.

4. The aqueous agrochemical composition according to claim 1, wherein component e) is present in
- e) 0.2% of citric acid.

5. A product comprising the aqueous agrochemical composition according to claim 1 in an agrochemical formulation to stabilize metribuzin and diflufenican.

6. A product comprising an aqueous agrochemical composition according to claim 1 for application in soybean.

7. A product comprising an aqueous agrochemical composition according to claim 1 as fertilizer compatible compositions for tank mixing.

8. The aqueous agrochemical composition according to claim 1 wherein the ratio of b) to c) is from 0.8:1 to 1:0.8.

9. The aqueous agrochemical composition according to claim 8, wherein the ratio of b) to c) is 1:1.

10. The aqueous agrochemical composition according to claim 3, wherein components b), c), d1), and e) are present in:
- b) 1.33% of sodium lignosulfonates,
- c) 1.33% of non-ionic block copolymers of ethylene oxide and propylene oxide having a MW of about 12,000,
- d1) 0.1% of HPMC, and
- (e) 0.2% of citric acid.

* * * * *